United States Patent [19]

Oury

[11] Patent Number: 4,806,865

[45] Date of Patent: Feb. 21, 1989

[54] DEVICE FOR MEASURING THE EARTH'S MAGNETIC FIELD DISTURBED BY ANOMALIES

[75] Inventor: Robert Oury, Valence, France

[73] Assignee: Crouzet-Société Anonyme Francaise, Paris, France

[21] Appl. No.: 121,910

[22] Filed: Nov. 17, 1987

[30] Foreign Application Priority Data

Nov. 18, 1986 [FR] France .................. 86 16130

[51] Int. Cl.⁴ .............................. G01R 33/24
[52] U.S. Cl. .............................. 324/301; 324/245
[58] Field of Search ............ 324/300, 301, 302, 318, 324/322, 245, 246, 247, 256, 258, 257, 260

[56] References Cited

U.S. PATENT DOCUMENTS 3,909,706  9/1975  Grescini ..................... 324/301

Primary Examiner—Michael J. Tokar
Attorney, Agent, or Firm—Lowe, Price, Leblanc, Becker & Shur

[57] ABSTRACT

A device is provided for measuring the earth's magnetic field disturbed by anomalies, including a probe in which are mounted, aligned and harmonized with each other, a nuclear magnetic resonance measuring probe associated with its oscillation electronics and the means for compensating for the anomalies due to the carrier: a triaxial magnetometer and a two axis gyrometer. The device can be mounted on land vehicles, ships and aircrafts.

6 Claims, 1 Drawing Sheet

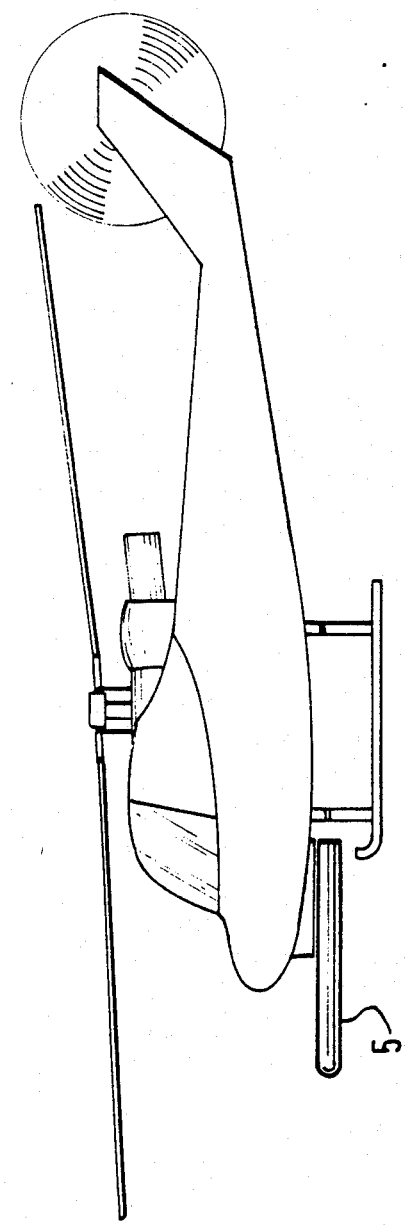
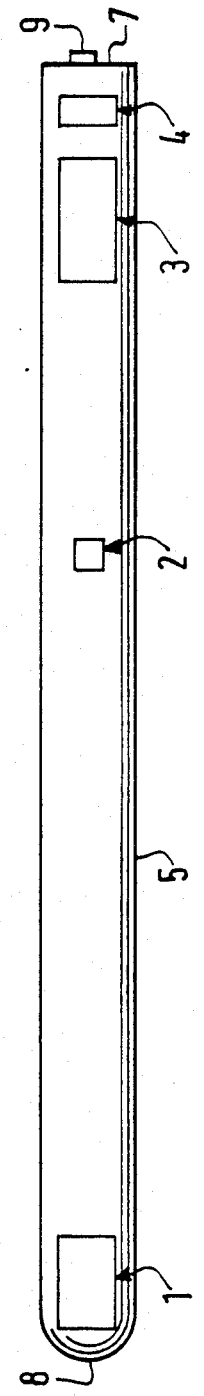
FIG.1
FIG.2

DEVICE FOR MEASURING THE EARTH'S MAGNETIC FIELD DISTURBED BY ANOMALIES

BACKGROUND OF THE INVENTION

1. Field of the Invention

The present invention relates to a device for measuring the earth's magnetic field disturbed by anomalies. More particularly, it leads to a device for measuring the earth's magnetic field and the anomalies thereof, from a land, sea or air carrying vehicle, which device includes an ultrasensitive magnetometric probe and means for compensating for the magnetic disturbances due to the carrying vehicle.

2. Description of the Prior Art

Certain devices already exist for measuring the earth's magnetic field and its anomalies.

Document No. FR-A-No. 2 060261 teaches such a device in which two magnetometric probes are mounted at the end of a mast. Besides the fact that it can only be used for single rotor helicopters, this device involves mounting the mast in the alignment of the shaft of the rotor, which results in operational constraints.

In other devices, a single magnetometric probe is used in cooperation with means for compensating for the disturbances of the magnetic field to be measured generated by the carrier vehicle. The magnetometric probe is moved as far away as possible from the carrier vehicle either at the end of a mast, fixed to the carrier vehicle, the compensation means being integrated in the carrier vehicle or, and for the case of aircraft, towed behind at the end of a cable.

Although these latter devices can be used on different types of carrier vehicles, the modifications of attitude of the carrier vehicle, that is to say the changes of orientation of the vehicle in the magnetic field to be measured, as well as the rate of these changes, however results in disturbances to the measurement.

Determination of this variable disturbing field, generated by the carrier vehicle, is obtained by a triaxial magnetometer which indicates the attitude of the carrier vehicle in the earth's magnetic field and by means of a gyrometric two axis block which indicates the rate of change of attitude of the carrier vehicle along two orthogonal axes.

Calculation of the compensation, using information delivered by said compensation means, requires previous harmonization of the magnetometric probe, of the magnetometer and of the gyrometric block, that is to say the paralleling of the reference trihedrons of these three sensors.

This operation is long, delicate, expensive and a hindrance from the operational point of view.

SUMMARY OF THE INVENTION

The present invention overcomes these drawbacks. For this, the present invention provides a device for measuring the earth's magnetic field disturbed by anomalies, including a magnetometric probe and compensation means mounted on the same frame so that their reference trihedrons have their axes respectively parallel.

Advantageously, the magnetometric probe includes a nuclear magnetic resonance (NMR) probe and a loop amplifier circuit, and the compensation means, a triaxial magnetometer and a two axis gyrometric block.

BRIEF DESCRIPTION OF THE DRAWINGS

The invention will be better understood from the following description of the preferred embodiment of the device of the invention, with reference to the accompanying drawings in which:

FIG. 1 shows the device mounted on a helicopter;
FIG. 2 shows a schematic view of the device.

DESCRIPTION OF THE PREFERRED EMBODIMENTS

The device shown in the drawings is intended for an aircraft. It includes a tubular pole 5, closed at one of its ends by a flat bottom 7 having centrally an electric connector 9 and, at the other end, by a hemispherical dome 8.

The pole and its closure elements are made from a rigid, amagnetic and preferably non conducting material, for example glass fiber reinforced epoxy resin.

This pole 5 is connected to the carrier, the aircraft, so that its axis is substantially parallel to the longitudinal axis of the carrier. As fixing means, a support proper to the carrier itself may be used guaranteeing good mechanical rigidity, for example a nacelle or a cradle, pole 5 being fixed to the support device by brackets positioned in a fixing zone formed substantially, and, here by the first third of the pole 5 and the flat bottom 7.

It will be noted that the mounting on the carrier could also take place through the wall, the first third of the pole being housed inside the carrier.

Inside pole 5 are mounted a nuclear magnetic resonance (NMR) probe 1, an electronic box 3 containing a loop amplifier, the assembly of the two being associated so as to form a nuclear oscillator, of the type described for example in French Pat. No. 1 352 587 and delivering a sinusoidal signal of a frequency proportional to the modulus of the magnetic field reigning in the environment in which the NMR probe 1 is placed.

A static three axis magnetometer 2 of the "flux gate" type is also disposed inside pole 5. For each of its three orthogonal axes rigidily connected to the box, the magnetometer has a coil with a ferromagnetic material core, coupled to an oscillator and to a servocontrol means, and which delivers a voltage proportional to the magnetic field along the axis considered.

A gyrometric block 4 with two axes of reference, of a mechanical type, is further placed inside pole 5. It delivers a voltage proportional to the speed of rotation of each of its two reference axes.

The NMR probe 1 for measuring the earth's magnetic field has a very high sensitivity—here of the order of $1.10^{-11}$ Telsa—it must be protected as much as possible from the disturbing field created by the carrier vehicle and must then be moved as far away therefrom as possible. For this reason, it is housed, via a resilient suspension, for example a resilient material, in the end of the pole close to dome 8 and in its axis.

The other elements of the device of the invention, the triaxial magnetometer 2, the loop amplifier 3 and the gyrometric block 4 are disposed in pole 5 while taking into account both their sensitivity to the magnetic fields and the fact that they may mutually interfere with each other from the magnetic point of view.

Thus (1) The NMR probe 1 is disturbed by the loop amplifier 3, the magnetometer 2 and the gyrometric block 4, (2) The magnetometer 2 is disturbed by the NMR probe 1, the loop amplifier 3 and the gyrometric block 4, (3) Only the loop amplifier and the gyrometric block 4, insensitive to the magnetic fields, are not disturbed by the other elements.

For this, the gyrometric block 4, is mounted at the end of pole 5 opposite that with the NMR probe 1, that is to say at the end close to the flat bottom 7 or the carrier, the loop amplifier 3 is mounted practically against the gyrometric block 4 in the axis of pole 5 towards its end 7, and the magnetometer 2 is also mounted in the axis of pole 5 and in a zone extending substantially on each side of the middle part of pole 5. In this position, considering its relatively low sensitivity—here of the order of $5.10^{-8}$ Telsa—this magnetometer 2 will be little disturbed by the carrier. The loop amplifier 3 is connected to pole 5 via a resilient suspension, the magnetometer 2 and the gyrometric block 4 are rigidly fixed to pole 5 by any appropriate known means.

The use, for processing, of the data delivered by the NMR probe 1, the magnetometer 2 and the gyrometric block 4 require these elements to be harmonized with each other, that is to say that their reference axes must be parallel. Here, and taking the axis of the NMR probe 1 as reference, which is substantially coaxial with pole 5, the magnetometer 2 is mounted so that one of its axes merges with that of the NMR probe 1 and the other two axes orthogonal to the axis of the probe, one in the vertical plane and the other in the horizontal plane. The gyrometric block 4 is mounted so that one of its axes also merges with that of the NMR probe 1 and the other orthogonal to this latter in the horizontal plane.

The alignment of these different axes, here within ±0.5°, may thus be achieved by construction and the whole of the device forms measuring equipment adaptable to carriers having different levels of magnetism and requiring no operation for alignment with the elements of said carrier.

This same device associated rigidly with elements creating experimentally a magnetic disturbance makes it possible to simulate on the ground the actual magnetic disturbances presented by a carrier and so to test the validity of the function for compensating for the magnetic disturbances generated by a carrier and by it changes of attitude in the earth's magnetic field.

What is claimed is:

1. A device for measuring the earth's magnetic field disturbed by anomalies, including a magnetometric probe and compensation means mounted on a single frame so that their reference trihedrons have their axes respectively parallel, wherein the magnetometric probe is a nuclear magnetic resonance probe coupled to a loop amplifier for forming a nuclear oscillator, wherein said compensation means includes a static triaxial magnetometer and a two axis gyrometric block, wherein the device is mounted on a carrier having a longitudinal axis, the magnetometric probe, the loop amplifier, the magnetometer and the gyrometric block are mounted in a cylindrical pole extending substantially along the longitudinal axis of the carrier with the magnetometric probe at the end of the pole, the loop amplifier and the gyrometric block at the opposite end of the pole and the magnetometer in a substantially middle zone.

2. The device as claimed in claim 1, wherein the end of the pole which contains the magnetometric probe is the furthest away from the carrier vehicle.

3. A device for measuring the earth's magnetic field, comprising a common carrier having a longitudinal axis, a magnetometric probe, a static triaxial magnetometer and a two axis gyrometric block in said carrier substantially on the longitudinal axis thereof, each of said probe, magnetometer and block having reference trihedrons, corresponding axes of said trihedrons being parallel to each other to compensate for magnetic field anomalies due to said carrier.

4. The device of claim 3, wherein said magnetometric probe comprises a nuclear magnetic resonance probe coupled to a loop amplifier and together forming a nuclear oscillator.

5. The device of claim 4, wherein said magnetometric probe, said loop amplifier, said magnetometer and said gyrometric block are mounted in a cylindrical pole extending substantially along said longitudinal axis of said carrier with the magnetometric probe at the end of the pole, the loop amplifier and the gyrometric block at the opposite end of the pole and the magnetometer in a substantially middle zone.

6. The device of claim 5, wherein the end of the pole which contains the magnetometric probe is the farthest away from a vehicle end of the carrier.

* * * * *